US012413591B2

(12) United States Patent
Aggarwal et al.

(10) Patent No.: US 12,413,591 B2
(45) Date of Patent: Sep. 9, 2025

(54) APPARATUS, METHODS, AND COMPUTER PROGRAMS

(71) Applicant: Nokia Technologies Oy, Espoo (FI)

(72) Inventors: Chaitanya Aggarwal, Munich (DE);
Suresh Nair, Whippany, NJ (US);
Saurabh Khare, Bangalore (IN); Anja Jerichow, Grafing bei München (DE);
Laurent Thiebaut, Antony (FR)

(73) Assignee: Nokia Technologies Oy, Espoo (FI)

( * ) Notice: Subject to any disclaimer, the term of this patent is extended or adjusted under 35 U.S.C. 154(b) by 662 days.

(21) Appl. No.: 17/736,622

(22) Filed: May 4, 2022

(65) Prior Publication Data

US 2022/0360586 A1 Nov. 10, 2022

(30) Foreign Application Priority Data

May 7, 2021 (IN) .............................. 202141020851

(51) Int. Cl.
*H04L 9/40* (2022.01)
*H04W 48/16* (2009.01)
(52) U.S. Cl.
CPC ........... *H04L 63/102* (2013.01); *H04W 48/16* (2013.01)
(58) Field of Classification Search
CPC ... H04L 63/102; H04L 63/0807; H04W 48/16
See application file for complete search history.

(56) References Cited

U.S. PATENT DOCUMENTS

| 2014/0337955 | A1* | 11/2014 | Mendelovich | .......... | H04L 63/08 |
| | | | | | 726/9 |
| 2016/0359846 | A1* | 12/2016 | Yoshimuta | .......... | H04L 63/0807 |
| 2021/0168139 | A1* | 6/2021 | Li | .......................... | H04L 63/104 |
| 2022/0294775 | A1* | 9/2022 | Singh | .................. | H04L 63/0884 |

OTHER PUBLICATIONS

"3rd Generation Partnership Project; Technical Specification Group Services and System Aspects; Security architecture and procedures for 5G system (Release 17)", 3GPP TS 33.501, V17.0.0, Dec. 2020, pp. 1-253.
"A Slice in Time: Slicing Security in 5G Core Networks", Adaptive Mobile Security, V1.00, Mar. 17, 2021, 36 pages.
"5G slicing can be dicey, says security specialist", Lightreading, Retrieved on Apr. 9, 2022, Webpage available at : https://www.lightreading.com/security/5g-slicing-can-be-dicey-says-security-specialist/d/d-id/768356.

(Continued)

*Primary Examiner* — Khoi V Le
(74) *Attorney, Agent, or Firm* — Duft & Bornsen, PC

(57) ABSTRACT

There is provided a method, apparatus and computer program product for causing a network repository function to perform: receiving, from a network function service consumer, an access request for an access authorization token, the request comprising a first identification of the network function service consumer and a first identification of at least one network slice on which access is requested; generating an access token in response to the request, the access token comprising at least one network slice identifier for the at least one network slice identified by the first identification; and providing the generated access token to the network function in response to the request for an access authorization token.

6 Claims, 7 Drawing Sheets

(56) References Cited

OTHER PUBLICATIONS

"3rd Generation Partnership Project; Technical Specification Group Core Network and Terminals; 5G System; Network Function Repository Services; Stage 3 (Release 17)", 3GPP TS 29.510, V17.1.0, Mar. 2021, pp. 1-243.

"3rd Generation Partnership Project; Technical Specification Group Services and System Aspects; System architecture for the 5G System (5GS); Stage 2 (Release 17)", 3GPP TS 23.501, V17.0.0, Mar. 2021, pp. 1-489.

Hardt, "The OAuth 2.0 Authorization Framework", RFC 6749, Internet Engineering Task Force (IETF), Oct. 2012, pp. 1-76.

Jones et al., "JSON Web Token (Jwt)", RFC 7519, Internet Engineering Task Force (IETF), May 2015, pp. 1-30.

Jones et al., "JSON Web Signature (JWS)", RFC 7515, Internet Engineering Task Force (IETF), May 2015, pp. 1-59.

\* cited by examiner

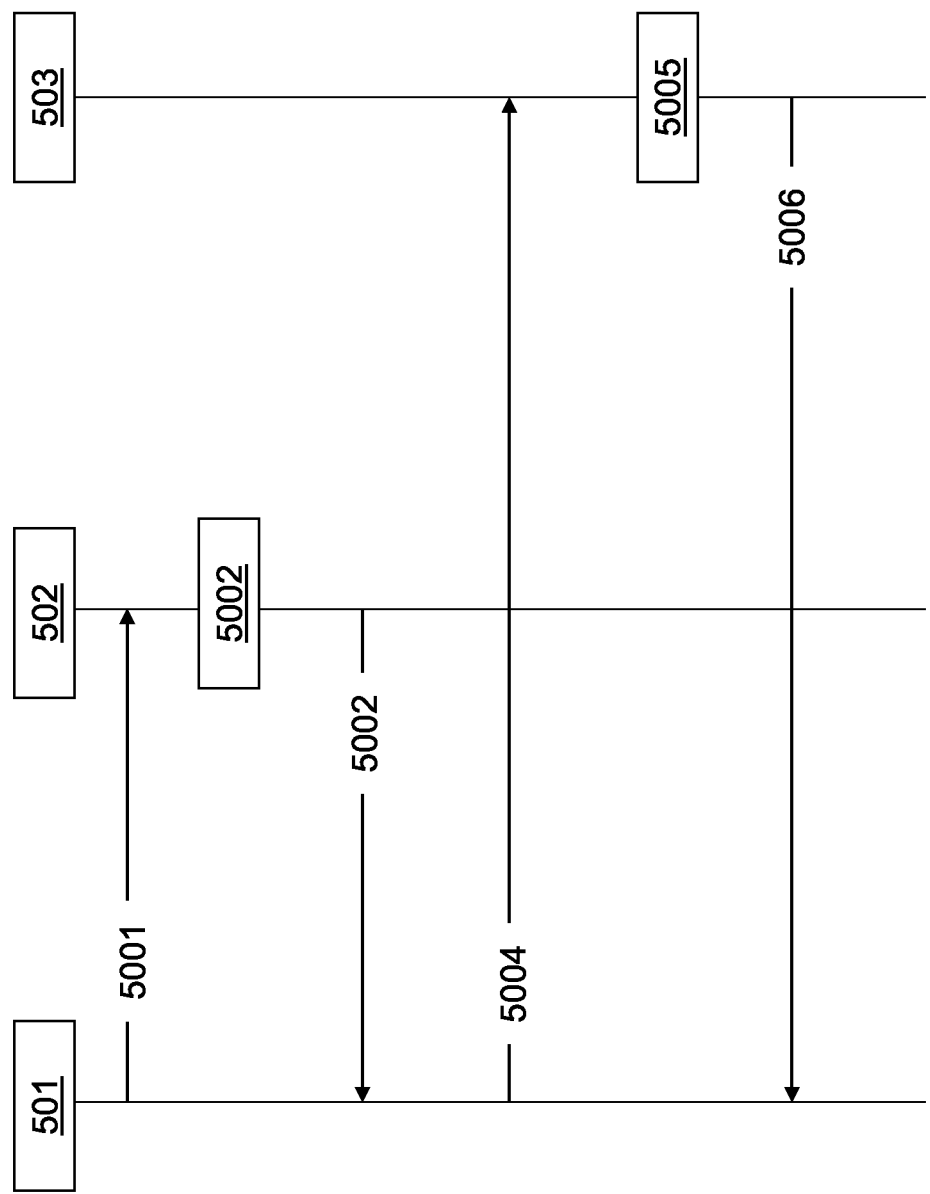

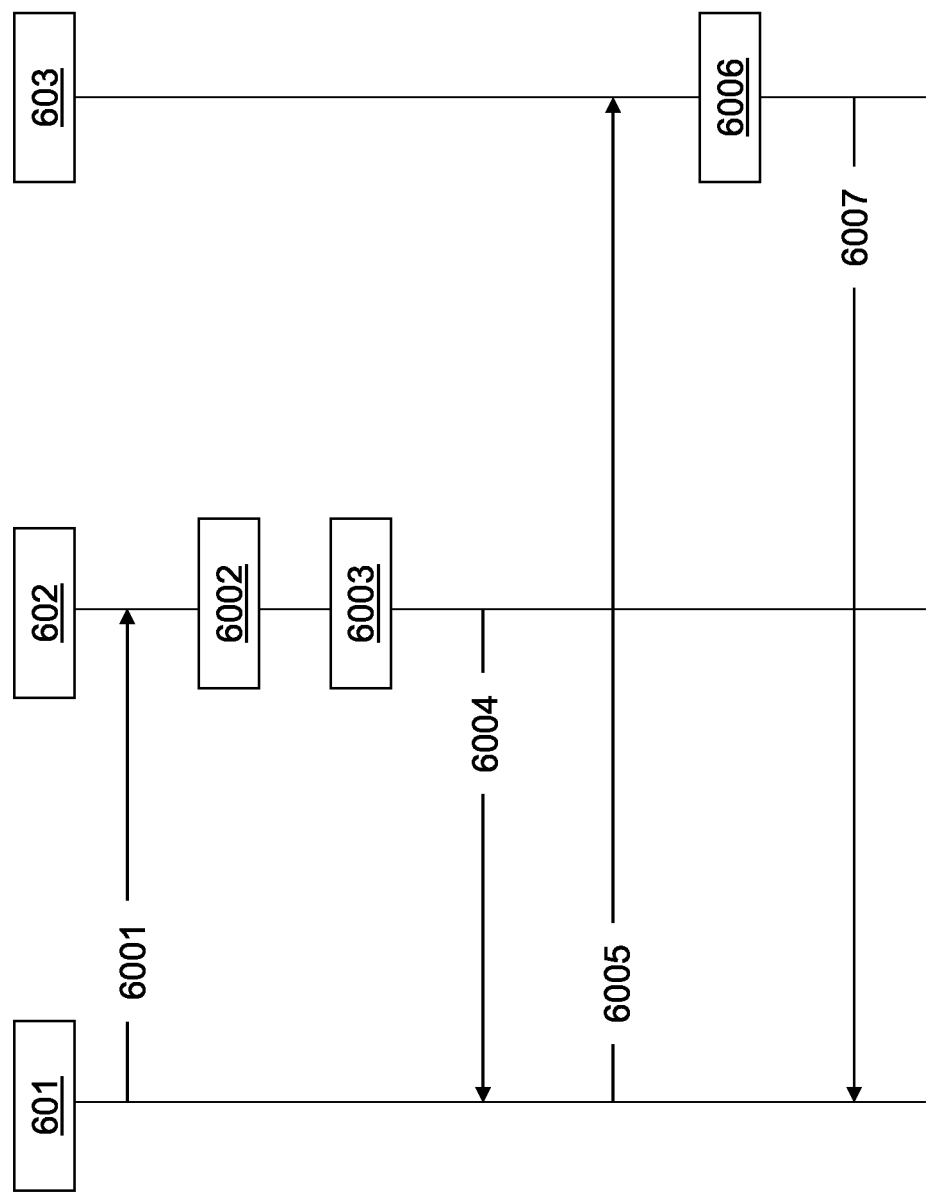

APPARATUS, METHODS, AND COMPUTER PROGRAMS

FIELD

The present disclosure relates to apparatus, methods, and computer programs, and in particular but not exclusively to apparatus, methods and computer programs for network apparatuses.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G system that allows user equipment (UE) or user device to contact a 5G core via e.g. new radio (NR) access technology or via other access technology such as Untrusted Wireless Local Area Network (WLAN) access to 5GC or wireline access technology.

SUMMARY

According to a first aspect, there is provided an apparatus for a network repository function, the apparatus comprising: at least one processor; and at least one memory comprising code that, when executed by the at least one processor, causes the apparatus to: receive, from a network function service consumer, an access request for an access authorization token, the request comprising a first identification of the network function service consumer and a first identification of at least one network slice on which access is requested; generate an access token in response to the request, the access token comprising at least one network slice identifier for the at least one network slice identified by the first identification; and provide the generated access token to the network function in response to the request for an access authorization token.

The request may comprise a certification token signed by the network function service consumer, the certification token comprising parameters of the network function service consumer, said parameters comprising at least one network slice belonging to the network function service consumer on which access is requested and a second identification of the network function service consumer.

The apparatus may be further caused to: use at least one of the certification token signed parameters of the network function service consumer to retrieve profile information for the network function service consumer, the profile information identifying at least one network slice accessible by the network function service consumer; and verify the access request by comparing identifiers for the network slices identified by the second identification to the at least one network slice identified by the profile information to determine whether any network slices are identified by both the second identification and the profile information, wherein the access token is generated when there is at least one network slice identified by both the second identification and the profile information.

The apparatus may be further caused to: use the second identification of the network function service consumer to retrieve profile information for the network function service consumer, the profile information identifying at least one network slice accessible by the network function service consumer; and verify the access request by comparing identifiers for the network slices identified by the first identification to the at least one network slice identified by the profile information to determine whether any network slices are identified by both the first identification and the profile information, wherein the access token is generated when there is at least one network slice identified by both the first identification and the profile information.

According to a second aspect, there is provided an apparatus for a network function service consumer, the apparatus comprising: at least one processor; and at least one memory comprising code that, when executed by the at least one processor, causes the apparatus to: send, to a network repository function, an access request for an access authorization token, the request comprising an identification of the network function service consumer and a first identification of at least one network slice on which access is requested; receive, from the network repository function, an access token in response to the request, the access token comprising at least one network slice identifier for the at least one network slice identified in the first identification; and send a service request to a network function service producer for accessing a service provided by the network function service producer, the service request comprising the access token.

The access request may comprise a certification token signed by the network function service consumer, the certification token comprising parameters of the network function service consumer, said parameters comprising at least one network slice belonging to the network function service consumer on which access is requested and a second identification of the network function service consumer.

The service request may comprise a certification token signed by the network function service consumer, the certification token comprising parameters of the network function service consumer, said parameters comprising at least one network slice belonging to the network function service consumer on which access is requested and a second identification of the network function service consumer.

According to a third aspect, there is provided an apparatus for a network function service producer, the apparatus comprising: at least one processor; and at least one memory comprising code that, when executed by the at least one processor, causes the apparatus to: receive, from a network function service consumer, a service request, the service request comprising an access token and a first identification of at least one network slice for which the service request is requested, and the access token comprising at least one network slice identifier for at least one network slice; verify the service request by comparing the at least one network slice identifier in the access token to the at least one network slice identified by the first identification to determine whether there is at least one match; and respond to the service request with information related to the requested service when there is at least one match.

The service request may comprise a certification token signed by the network function service consumer, the certification token comprising parameters of the network function service consumer, said parameters comprising at least one network slice belonging to the network function service consumer on which access is requested and a second identification of the network function service consumer.

Said verify the service request may further comprise comparing the at least one network slice identifier in the access token to the at least one network slice identified by the second identification to determine whether there is at least one match.

Said respond to the service request with information related to the requested service when there is at least one match may be further dependent on the said determine whether there is at least one match between the at least one network slice identifier in the access token to the at least one network slice identified by the second identification.

The apparatus may be further caused to respond to the service request with a failure indication when there is no matching network slice identifier.

According to a fourth aspect, there is provided an apparatus for a network repository function, the apparatus comprising: means for receiving, from a network function service consumer, an access request for an access authorization token, the request comprising a first identification of the network function service consumer and a first identification of at least one network slice on which access is requested; means for generating an access token in response to the request, the access token comprising at least one network slice identifier for the at least one network slice identified by the first identification; and means for providing the generated access token to the network function in response to the request for an access authorization token.

The request may comprise a certification token signed by the network function service consumer, the certification token comprising parameters of the network function service consumer, said parameters comprising at least one network slice belonging to the network function service consumer on which access is requested and a second identification of the network function service consumer.

The apparatus may comprise: means for using at least one of the certification token signed parameters of the network function service consumer to retrieve profile information for the network function service consumer, the profile information identifying at least one network slice accessible by the network function service consumer; and means for verifying the access request by comparing identifiers for the network slices identified by the second identification to the at least one network slice identified by the profile information to determine whether any network slices are identified by both the second identification and the profile information, wherein the access token is generated when there is at least one network slice identified by both the second identification and the profile information.

The apparatus may comprise: means for using the second identification of the network function service consumer to retrieve profile information for the network function service consumer, the profile information identifying at least one network slice accessible by the network function service consumer; and means for verifying the access request by comparing identifiers for the network slices identified by the first identification to the at least one network slice identified by the profile information to determine whether any network slices are identified by both the first identification and the profile information, wherein the access token is generated when there is at least one network slice identified by both the first identification and the profile information.

According to a fifth aspect, there is provided an apparatus for a network function service consumer, the apparatus comprising: means for sending, to a network repository function, an access request for an access authorization token, the request comprising an identification of the network function service consumer and a first identification of at least one network slice on which access is requested; means for receiving, from the network repository function, an access token in response to the request, the access token comprising at least one network slice identifier for the at least one network slice identified in the first identification; and means for sending a service request to a network function service producer for accessing a service provided by the network function service producer, the service request comprising the access token.

The access request may comprise a certification token signed by the network function service consumer, the certification token comprising parameters of the network function service consumer, said parameters comprising at least one network slice belonging to the network function service consumer on which access is requested and a second identification of the network function service consumer.

The service request may comprise a certification token signed by the network function service consumer, the certification token comprising parameters of the network function service consumer, said parameters comprising at least one network slice belonging to the network function service consumer on which access is requested and a second identification of the network function service consumer.

According to a sixth aspect, there is provided an apparatus for a network function service producer, the apparatus comprising: means for receiving, from a network function service consumer, a service request, the service request comprising an access token and a first identification of at least one network slice for which the service request is requested, and the access token comprising at least one network slice identifier for at least one network slice; means for verifying the service request by comparing the at least one network slice identifier in the access token to the at least one network slice identified by the first identification to determine whether there is at least one match; and means for responding to the service request with information related to the requested service when there is at least one match.

The service request may comprise a certification token signed by the network function service consumer, the certification token comprising parameters of the network function service consumer, said parameters comprising at least one network slice belonging to the network function service consumer on which access is requested and a second identification of the network function service consumer.

Said verifying the service request may further comprise comparing the at least one network slice identifier in the access token to the at least one network slice identified by the second identification to determine whether there is at least one match.

Said respond to the service request with information related to the requested service when there is at least one match may be further dependent on the said determine whether there is at least one match between the at least one network slice identifier in the access token to the at least one network slice identified by the second identification.

The apparatus may comprise means for responding to the service request with a failure indication when there is no matching network slice identifier.

According to a seventh aspect, there is provided a method for an apparatus for a network repository function, the method comprising: receiving, from a network function service consumer, an access request for an access authorization token, the request comprising a first identification of the network function service consumer and a first identification of at least one network slice on which access is requested; generating an access token in response to the request, the access token comprising at least one network slice identifier for the at least one network slice identified by the first identification; and providing the generated access token to the network function in response to the request for an access authorization token.

The request may comprise a certification token signed by the network function service consumer, the certification token comprising parameters of the network function service consumer, said parameters comprising at least one network slice belonging to the network function service consumer on which access is requested and a second identification of the network function service consumer.

The method may comprise: using at least one of the certification token signed parameters of the network function service consumer to retrieve profile information for the network function service consumer, the profile information identifying at least one network slice accessible by the network function service consumer; and verifying the access request by comparing identifiers for the network slices identified by the second identification to the at least one network slice identified by the profile information to determine whether any network slices are identified by both the second identification and the profile information, wherein the access token is generated when there is at least one network slice identified by both the second identification and the profile information.

The method may comprise: using the second identification of the network function service consumer to retrieve profile information for the network function service consumer, the profile information identifying at least one network slice accessible by the network function service consumer; and verifying the access request by comparing identifiers for the network slices identified by the first identification to the at least one network slice identified by the profile information to determine whether any network slices are identified by both the first identification and the profile information, wherein the access token is generated when there is at least one network slice identified by both the first identification and the profile information.

According to an eighth aspect, there is provided a method for an apparatus for a network function service consumer, the method comprising: sending, to a network repository function, an access request for an access authorization token, the request comprising an identification of the network function service consumer and a first identification of at least one network slice on which access is requested; receiving, from the network repository function, an access token in response to the request, the access token comprising at least one network slice identifier for the at least one network slice identified in the first identification; and sending a service request to a network function service producer for accessing a service provided by the network function service producer, the service request comprising the access token.

The access request may comprise a certification token signed by the network function service consumer, the certification token comprising parameters of the network function service consumer, said parameters comprising at least one network slice belonging to the network function service consumer on which access is requested and a second identification of the network function service consumer.

The service request may comprise a certification token signed by the network function service consumer, the certification token comprising parameters of the network function service consumer, said parameters comprising at least one network slice belonging to the network function service consumer on which access is requested and a second identification of the network function service consumer.

According to a ninth aspect, there is provided a method for an apparatus for a network function service producer, the method comprising: receiving, from a network function service consumer, a service request, the service request comprising an access token and a first identification of at least one network slice for which the service request is requested, and the access token comprising at least one network slice identifier for at least one network slice; verifying the service request by comparing the at least one network slice identifier in the access token to the at least one network slice identified by the first identification to determine whether there is at least one match; and m responding to the service request with information related to the requested service when there is at least one match.

The service request may comprise a certification token signed by the network function service consumer, the certification token comprising parameters of the network function service consumer, said parameters comprising at least one network slice belonging to the network function service consumer on which access is requested and a second identification of the network function service consumer.

Said verifying the service request may further comprise comparing the at least one network slice identifier in the access token to the at least one network slice identified by the second identification to determine whether there is at least one match.

Said respond to the service request with information related to the requested service when there is at least one match may be further dependent on the said determine whether there is at least one match between the at least one network slice identifier in the access token to the at least one network slice identified by the second identification.

The method may comprise responding to the service request with a failure indication when there is no matching network slice identifier.

According to a tenth aspect, there is provided an apparatus for a network repository function, the apparatus comprising: receiving circuitry for receiving, from a network function service consumer, an access request for an access authorization token, the request comprising a first identification of the network function service consumer and a first identification of at least one network slice on which access is requested; generating circuitry for generating an access token in response to the request, the access token comprising at least one network slice identifier for the at least one network slice identified by the first identification; and providing circuitry for providing the generated access token to the network function in response to the request for an access authorization token.

The request may comprise a certification token signed by the network function service consumer, the certification token comprising parameters of the network function service consumer, said parameters comprising at least one network slice belonging to the network function service consumer on which access is requested and a second identification of the network function service consumer.

The apparatus may comprise: using circuitry for using at least one of the certification token signed parameters of the network function service consumer to retrieve profile information for the network function service consumer, the profile information identifying at least one network slice accessible by the network function service consumer; and verifying circuitry for verifying the access request by comparing identifiers for the network slices identified by the second identification to the at least one network slice identified by the profile information to determine whether any network slices are identified by both the second identification and the profile information, wherein the access token is generated when there is at least one network slice identified by both the second identification and the profile information.

The apparatus may comprise: using circuitry for using the second identification of the network function service consumer to retrieve profile information for the network function service consumer, the profile information identifying at least one network slice accessible by the network function service consumer; and verifying circuitry for verifying the access request by comparing identifiers for the network slices identified by the first identification to the at least one network slice identified by the profile information to determine whether any network slices are identified by both the first identification and the profile information, wherein the access token is generated when there is at least one network slice identified by both the first identification and the profile information.

According to an eleventh aspect, there is provided an apparatus for a network function service consumer, the apparatus comprising: sending circuitry for sending, to a network repository function, an access request for an access authorization token, the request comprising an identification of the network function service consumer and a first identification of at least one network slice on which access is requested; receiving circuitry for receiving, from the network repository function, an access token in response to the request, the access token comprising at least one network slice identifier for the at least one network slice identified in the first identification; and sending circuitry for sending a service request to a network function service producer for accessing a service provided by the network function service producer, the service request comprising the access token.

The access request may comprise a certification token signed by the network function service consumer, the certification token comprising parameters of the network function service consumer, said parameters comprising at least one network slice belonging to the network function service consumer on which access is requested and a second identification of the network function service consumer.

The service request may comprise a certification token signed by the network function service consumer, the certification token comprising parameters of the network function service consumer, said parameters comprising at least one network slice belonging to the network function service consumer on which access is requested and a second identification of the network function service consumer.

According to a twelfth aspect, there is provided an apparatus for a network function service producer, the apparatus comprising: receiving circuitry for receiving, from a network function service consumer, a service request, the service request comprising an access token and a first identification of at least one network slice for which the service request is requested, and the access token comprising at least one network slice identifier for at least one network slice; verifying circuitry for verifying the service request by comparing the at least one network slice identifier in the access token to the at least one network slice identified by the first identification to determine whether there is at least one match; and responding circuitry for responding to the service request with information related to the requested service when there is at least one match.

The service request may comprise a certification token signed by the network function service consumer, the certification token comprising parameters of the network function service consumer, said parameters comprising at least one network slice belonging to the network function service consumer on which access is requested and a second identification of the network function service consumer.

Said verifying circuitry for verifying the service request may further comprise comparing circuitry for comparing the at least one network slice identifier in the access token to the at least one network slice identified by the second identification to determine whether there is at least one match.

Said responding circuitry for responding to the service request with information related to the requested service when there is at least one match may be further dependent on the said determine whether there is at least one match between the at least one network slice identifier in the access token to the at least one network slice identified by the second identification.

The apparatus may comprise responding circuitry for responding to the service request with a failure indication when there is no matching network slice identifier.

According to a thirteenth aspect, there is provided non-transitory computer readable medium comprising program instructions for causing an apparatus for a network repository function to perform at least the following: receive, from a network function service consumer, an access request for an access authorization token, the request comprising a first identification of the network function service consumer and a first identification of at least one network slice on which access is requested; generate an access token in response to the request, the access token comprising at least one network slice identifier for the at least one network slice identified by the first identification; and provide the generated access token to the network function in response to the request for an access authorization token.

The request may comprise a certification token signed by the network function service consumer, the certification token comprising parameters of the network function service consumer, said parameters comprising at least one network slice belonging to the network function service consumer on which access is requested and a second identification of the network function service consumer.

The apparatus may be further caused to: use at least one of the certification token signed parameters of the network function service consumer to retrieve profile information for the network function service consumer, the profile information identifying at least one network slice accessible by the network function service consumer; and verify the access request by comparing identifiers for the network slices identified by the second identification to the at least one network slice identified by the profile information to determine whether any network slices are identified by both the second identification and the profile information, wherein the access token is generated when there is at least one network slice identified by both the second identification and the profile information.

The apparatus may be further caused to: use the second identification of the network function service consumer to retrieve profile information for the network function service consumer, the profile information identifying at least one network slice accessible by the network function service consumer; and verify the access request by comparing identifiers for the network slices identified by the first identification to the at least one network slice identified by the profile information to determine whether any network slices are identified by both the first identification and the profile information, wherein the access token is generated when there is at least one network slice identified by both the first identification and the profile information.

According to a fourteenth aspect, there is provided non-transitory computer readable medium comprising program instructions for causing an apparatus for a network function service consumer to perform at least the following: send, to a network repository function, an access request for an access authorization token, the request comprising an identification of the network function service consumer and a first identification of at least one network slice on which access is requested; receive, from the network repository function, an access token in response to the request, the access token comprising at least one network slice identifier for the at least one network slice identified in the first identification; and send a service request to a network function service producer for accessing a service provided by the network function service producer, the service request comprising the access token.

The access request may comprise a certification token signed by the network function service consumer, the certification token comprising parameters of the network function service consumer, said parameters comprising at least one network slice belonging to the network function service consumer on which access is requested and a second identification of the network function service consumer.

The service request may comprise a certification token signed by the network function service consumer, the certification token comprising parameters of the network function service consumer, said parameters comprising at least one network slice belonging to the network function service consumer on which access is requested and a second identification of the network function service consumer.

According to a fifteenth aspect, there is provided non-transitory computer readable medium comprising program instructions for causing an apparatus for a network function service producer to perform at least the following: receive, from a network function service consumer, a service request, the service request comprising an access token and a first identification of at least one network slice for which the service request is requested, and the access token comprising at least one network slice identifier for at least one network slice; verify the service request by comparing the at least one network slice identifier in the access token to the at least one network slice identified by the first identification to determine whether there is at least one match; and respond to the service request with information related to the requested service when there is at least one match.

The service request may comprise a certification token signed by the network function service consumer, the certification token comprising parameters of the network function service consumer, said parameters comprising at least one network slice belonging to the network function service consumer on which access is requested and a second identification of the network function service consumer.

Said verify the service request may further comprise comparing the at least one network slice identifier in the access token to the at least one network slice identified by the second identification to determine whether there is at least one match.

Said respond to the service request with information related to the requested service when there is at least one match may be further dependent on the said determine whether there is at least one match between the at least one network slice identifier in the access token to the at least one network slice identified by the second identification.

The apparatus may be further caused to respond to the service request with a failure indication when there is no matching network slice identifier.

According to a sixteenth aspect, there is provided a computer program comprising program instructions for causing a computer to perform any method as described above.

According to a seventeenth aspect, there is provided a computer program product stored on a medium that may cause an apparatus to perform any method as described herein.

According to an eighteenth aspect, there is provided an electronic device that may comprise apparatus as described herein.

According to a nineteenth aspect, there is provided a chipset that may comprise an apparatus as described herein.

BRIEF DESCRIPTION OF FIGURES

Examples will now be described, by way of example only, with reference to the accompanying Figures in which:

FIGS. 5 and 6 are example signalling diagrams; and

DETAILED DESCRIPTION

In the following, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems with analogous components (for example, current 6G proposals). In the following, 3GPP refers to a group of organizations that develop and release different standardized communication protocols. 3GPP is currently developing and publishing documents related to Release 16, relating to 5G technology, with Release 17 currently being scheduled for 2022.

Before explaining in detail the exemplifying embodiments, certain general principles of a 5G wireless communication system are briefly explained with reference to FIG. 1.

Figure 1:
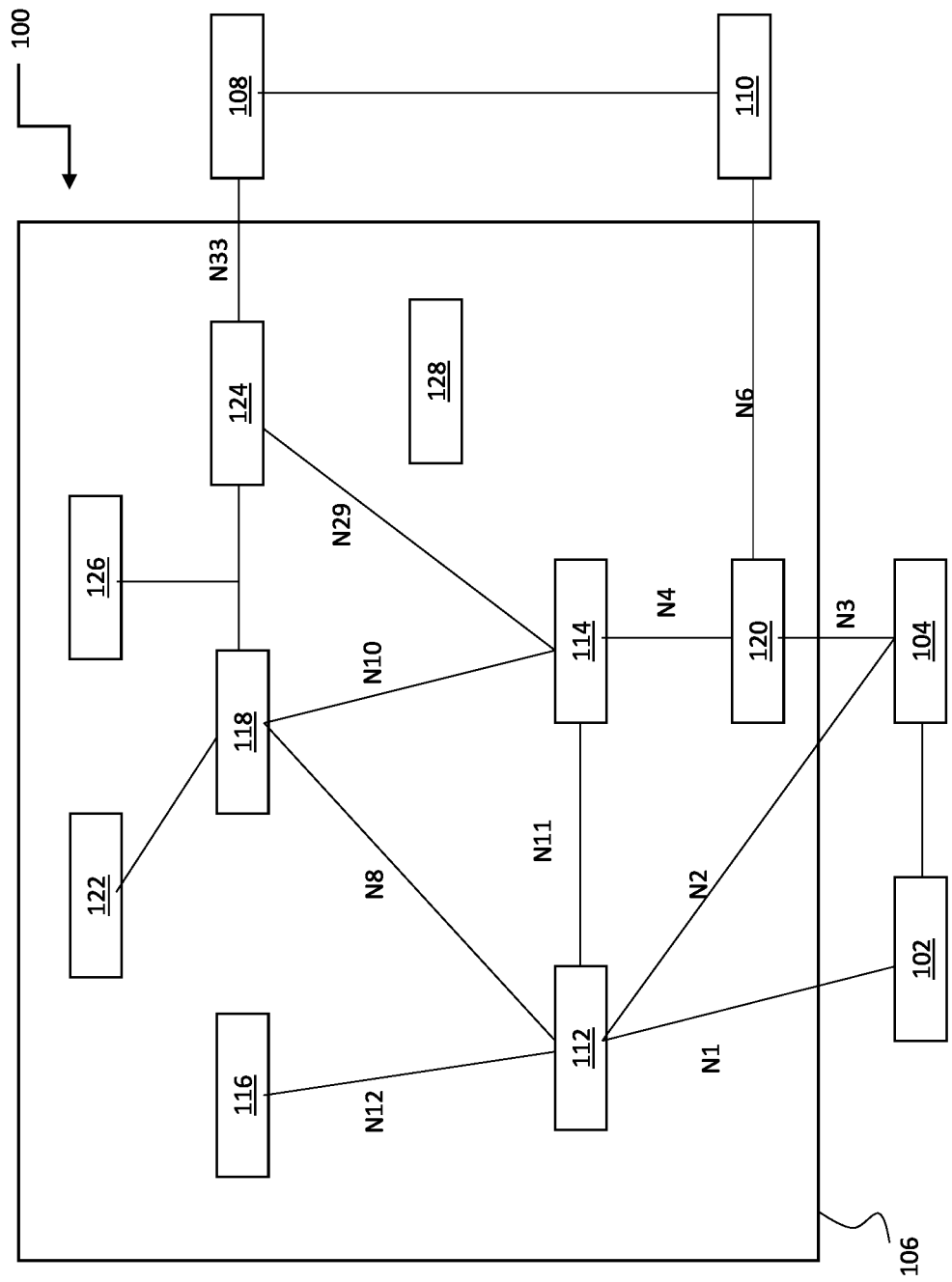
FIG. 1 shows a schematic representation of a 5G system.

FIG. 1 shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes. It is understood that although the example network element is shown as a single apparatus, that the functions of the network element may be split amongst several distinct apparatuses.

The 5GC 106 may comprise one or more network functions, including one or more Access Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. Although the NRF 128 is not depicted with its interfaces, it is understood that this is for clarity reasons and that NRF 128 may have a plurality of interfaces with other network functions. It is understood that although the example network functions are respectively shown as a single apparatus, that the functions of each network function may be split amongst several distinct apparatuses.

The NRF performs multiple functions for the 5GC 106. For example, the NRF is configured to maintain a network function (NF) profile of available NF instances and their supported services, where an NF instance identifier represents an identifier identifying a particular NF/NF instance. The NF instance identifier is provided by the NF service consumer (i.e. a network function that is requesting a service from another entity, such as an NF service producer), and is globally unique inside the Public landline Mobile Network of the NRF in which the NF is registered. The NRF is also configured to allow other NF instances to subscribe to, and get notified about, the registration in NRF of new NF instances of a given type. The NRF is further configured to support service discovery functions by receiving NF Discovery Requests from NF instances, and provide information in respect of available NF instances fulfilling certain criteria (e.g., supporting a given service) in response to those NF Discovery Requests.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The 5G standards introduced a new architectural concept into 3GPP communication networks called the Service Based Architecture (SBA). Using this architecture, Network Functions (NFs) can be virtualized and provide their services, using defined protocols and interfaces to other network functions or external parties' "verticals" (e.g. industrial application such as transport, media, and manufacturing). The interfaces are referred to as service-based interfaces (SBI), and may comprise REST API-based interfaces. The protocols for communication between the network elements may be, for example, the common HTTP/2 Internet protocol.

The 5G system comprises concepts such as network slicing and network virtualization as part of its infrastructure. While the terms slicing, virtualization, cloud, edge computing and programmable network are often used in conjunction, the combination of these technologies can be powerful. Virtualization, cloud and slicing are technologies that run on different layers and different parts of the network. They complement each other, and together enable the slicing concept for vertical use cases.

Network slicing is a type of virtual networking architecture that enables the creation of multiple virtual networks on top of a shared physical infrastructure. For example, core network control plane parts, user plane network function parts, and access network parts of a network may be kept separate. This would enable user plane functionality to be deployed closer to an edge of a communication network (such as in access points), while management functions for the network may remain in the core network architecture. The virtual/logical networks are referred to as network slices.

A slice is a logical block in the 5G core network that is configured to serve a specific purpose. In other words, network slices may be configured for specific use cases. For example, there may be an Internet of Things slice, a mobile broadband slice and a healthcare slice all operating the same network infrastructure. Each slice may serve a particular service type with an agreed service level agreement (SLA), providing respective quality/service levels according to their SLA. Therefore, network slices may be thought of an end-to-end logical network running on a common underlying network (virtual or physical) that are mutually isolated with independent control and management functions.

Network slicing was introduced and described for 3GPP in Release 15 in TS 23.501. In this document, the 5G core network sends a configured Network Slice Selection Assistance Information (NSSAI) to a user equipment during an Attach procedure for that user equipment. The NSSAI identifies at least one slice. Thereafter, whenever the user equipment performs a Registration Area update, the user equipment can indicate a requested NSSAI. An Access and Mobility Function (AMF) in the 5G core network takes this requested NSSAI into account together with subscribed NSSAI to infer an allowed NSSAI for the user equipment. This allowed NSSAI may be sent back to the user equipment. The allowed NSSAI represents the list of S-NSSAI(s) that the AMF has allowed the user equipment to use for further requests taking place in this Registration Area.

3GPP defines at least one other slice identifier, the Network Slice Instance Identifier (NSI ID). For clarity throughout the following, it is understood that references to an NSSAI and/or to a network slice identifier (or equivalent) encompasses both an NSSAI and an NSI ID.

In the above, a slice in the core network comprises at least one network function (NF) that supports that slice, and often a plurality of network functions. The network functions can be virtual or physical. A physical node may host several network functions in 5G. The network functions can be exclusively assigned to that slice or be shared among different slices.

As some network functions may be shared among different slices, security can be an issue. A recent work has highlighted the effect that slicing attacks may have on the system.

For example, a rogue or malicious NF service consumer can impersonate a NF from a different slice by inserting a different network slice identifier (e.g. a Network Slice Selection Assistance Information (NSSAI) in current terminology) into a request to an NRF for an access token. For example, an incorrect NSSAI/slice identifier may be inserted into a requesterSnssaiList field as part of an access-token-get request to the NRF. The NRF will then provide a token to the requesting NF service consumer to access a shared resource between two slices based on that provided NSSAI identification.

Currently, there are no means present at the NRF to verify the slice of the NF service consumer. This problem is compounded by the fact that there may be multiple NRFs in the 5GC.

Aside from this 5GC weakness, there may also be security concerns at the NF service producer side (i.e. at the NF providing the requested service). This is because there are currently no means existing to verify if the request is coming from the NF service consumer of a genuine slice. Instead, the NF service producer only verifies that the target NF slice is present in the access token claims and that it is pointing towards its own slice identifier.

There are therefore security issues at multiple points in the chain.

This is illustrated below with respect to FIG. 5.

FIG. 5 illustrates a call signalling flow between an NF service consumer 501, an NRF 502, and an NF service producer 503. The NF service consumer is presumed to belong to a first slice, and not a second slice in this example. The NF service producer is presumed to belong to both the first slice and the second slice in this example.

At 5001, the NF service consumer 501 signals the NRF 502. This signalling may be a request for an access token. The request may comprise an identifier for the second slice when the NF service consumer 501 is seeking to utilize unauthorized resources.

At 5002, the NRF 502 validates the requesting network function based on the signalled second slice identifier. This results in the generation of an access token using the signalled second slice identifier. This access token may be, for example, an OAuth access token. An OAuth framework is currently defined in RFC 6749, and described in 3GPP TS 33.501.

A current definition of this access token is provided in table 1, below.

TABLE 1

Information elements/claims defined in an access token

| Attribute name | Data type | P | Cardinality | Description |
| --- | --- | --- | --- | --- |
| Iss | NfInstanceId | M | 1 | This Information element comprises NF instance id of the NRF, corresponding to the standard "Issuer" claim described in IETF RFC 7519, section 4.1.1 |
| Sub | NfInstanceId | M | 1 | This Information element comprises the NF instance ID of the NF service consumer, corresponding to the standard "Subject" claim described in IETF RFC 7519, section 4.1.2. |
| Aud | Audience | M | 1 | This Information element comprises the NF service producer's NF instance ID(s) (if the exact NF instance(s) of the NF service producer is known) or the NF type of NF service producers for which the claim is applicable, corresponding to the standard "Audience" claim described in IETF RFC 7519, section 4.1.3. |
| scope | String | M | 1 | This Information element comprises the name of the NF services for which the access_token is authorized for use; this claim corresponds to a private claim, as described in IETF RFC 7519, section 4.3. pattern: '^([a-zA-Z0-9_-]+)( [a-zA-Z0-9_-]+)*$' |
| exp | integer | M | 1 | This Information element comprises the number of seconds after which the access_token is considered to be expired, corresponding to the standard "Expiration Time" claim described in IETF RFC 7519 [25], section 4.1.4. |

At 5003, the NRF 502 signals the NF service consumer 501 the access token generated during 5002 using the signalled second slice identifier.

At 5004, the NF service consumer 501 signals a service request to the NF service producer 503. This service request comprises the access token received at 5003.

At 5005, the NF service producer 503 verifies the token by determining that the NF service producer serves the slice allowed by the token. This verification may be performed using the second slice identifier. In other words, as the token will have only slice details for the second slice, in 5005 the NF service producer can verify the second slice, which it is serving. There is no way available where NF service producer can validate the slice details of the NF service consumer.

At 5006, the NF service producer 503 signals a service request response the NF service consumer 501 in response to the service request of 5004. This service request response may comprise at least part of the service requested in the service request.

The following proposes several mechanisms for making it more difficult for an NF service consumer to fraudulently access services associated with a different slice identifier. These will be considered in the following in a chronological order in which it may be applied. However, it is understood that this is not limiting.

The first mechanism considers enhancing the currently defined access token request sent by the NF service consumer to NRF so that it is accompanied with a client credentials assertion (CCA).

The client credentials assertion is a defined procedure for requesting authentication of a requesting client. The client credentials assertion (CCA) is a token signed by the NF service consumer that generates it, and may also be referred to as a credentials token. The CCA enables the NF service consumer to authenticate itself towards a receiving end point by including the signed token in a service request. The receiving end point may then authenticate this NF service consumer using profile information registered to that NF service consumer. The receiving end point may be, for example, at least one of the NRF and the NF service producer. The CCA includes the NF service consumer's NF Instance ID, which may be checked against the certificate held by the NF service producer and/or the NRF. The CCA includes a timestamp as basis for restriction of its lifetime.

The current description of how the CCA is utilized by the NF and the NRF is provided in 3GPP TS 33.501. Under current communication protocol definitions, the client credentials assertion may be a JSON Web Token (JWT) as specified in IETF RFC 7519, digitally signed using JWS as specified in IETF RFC 7515 [24] and in 3GPP TS 33.501. The client credentials assertion may be provided in a header, such as the currently described 3gpp-Sbi-Client-Credentials header.

Currently, as the CCA is defined in 3GPP technical specification TS 33.501, the CCA comprises:

The NF instance ID of the NF service consumer;

A timestamp (iat) and an expiration time (exp) in a header, and

The NF type of the expected audience (audience), e.g. the type "NRF", "NF"

Under the present disclosure, the CCA may be expanded to also include a slice identifier, such as an NSSAI and/or a list of NSSAI to which a NF service consumer belongs. The CCA may then be provided by the NF service consumer to at least one of the NRF and/or the NF service producer for them to use to verify the NF service consumer for slicing purposes.

As another mechanism that may be used either alone or in combination with the above, the following proposes to expand the access token generated by the NRF to also include at least one slice identifier for which the access token is granted.

For example, when the NRF receives the access token request from the NF service consumer, the NRF verifies if the NSSAI and/or NSSAI list present in the accompanying CCA matches slice information comprised in the registered NF service consumer profile that corresponds to the NF identifier (e.g. the NF instance ID) present in the CCA.

The NRF may also verify that if the access token request is accompanied with the requesterSnssaiList parameter described above, then the slice identifier value present in the requesterSnssaiList matches both the slice identifier value in the CCA value as well as the slice identifier value in the NF Profile Information.

Therefore, the contents of the expanded CCA may be used to fetch a corresponding NF service consumer profile, before at least one value present in the Consumer Profile (e.g. an NSSAI value) is compared against at least one corresponding value present in the CCA and the value of requesterSnssaiList.

In other words, the NRF may perform an enhanced access token get request verification by matching the NSSAI list in the token request with the NSSAI ID in the CCA. The access token claims generated by the NRF may also be enhanced to include in at least one of the claims, the NSSAI(s) to which a NF service consumer belongs. This may be as described below in relation to Table 2.

The NRF may be configured to only generate the Access Token when a successful verification is performed.

Finally, the token verification at the NF service producer may be improved to verify that the NF service consumer belongs to the same slice for which the token was generated.

In this improvement, the NRF provides an enhanced access token to the NF service consumer in response to the NF service consumer's request. The enhanced token provides additional information that indicates those network slices to which the NF service consumer is subscribed/authorized. For example, the NRF may add the NF service consumer's NSSAI(s) into the access token claims by enhancing the AccessTokenClaims described above to comprise a new claim, "requesterSnssaiList". The NF service producer may use the information in this new claim to determine whether the NF service consumer is allowed to access/request/retrieve from the NF producer. This new claim may be as defined in Table 2 below, and mentioned above in relation to the expanded access token generated by the NRF:

TABLE 2

Additional Information elements/claims that may be defined in an access token

| Attribute name | Data type | P | Cardinality | Description |
| --- | --- | --- | --- | --- |
| requesterSnssaiList | Array (String) | O | 1 . . . n | When present, this comprises at least one NSSAI (potentially a list of NSSAIs) that the NF service consumer (for which the access token has been generated) belongs to. |

Based on the operator policy, the NRF may add the requesterSnssaiList in the claim even when the NF service consumer does not provide the CCA and/or details of the requesting Slice in the access token request. In other words, the NRF may insert at least one slice identifier (such as an NSSAI) into the access token for another network entity (e.g. an NF service producer) to use to validate a service request comprising the access token.

The NF service consumer after receiving the access token, sends the service request to NF service producer. This request is also accompanied by the enhanced CCA and enhanced access token as described above.

The NF service producer then, during the access token verification step, may verify if the requester NSSAI(s) value present in the CCA, matches the requesterSnssaiList present in the claims of the received access token. The NF service producer may also verify this NSSAI value against any other header/parameter sent during the service request. Only when the values match does the NF service producer send a relevant response back. Otherwise (i.e. when the values do not match), the NF service producer sends an error code, and/or an indication to drop/discard the header.

FIG. 6 is a signalling diagram illustrating potential signals that may be exchanged by network entities described herein.

FIG. 6 illustrates a call signalling flow between an NF service consumer 601, an NRF 602, and an NF service producer 603. The NF service consumer is presumed to belong to a first slice, and not a second slice in this example. The NF service producer is presumed to belong to both the first slice and the second slice in this example.

Further, the NF service consumer and the NF service producer may be assumed to be registered with the NRF. The NRF and the NF service producer may share credential information. The NRF and the NF service consumer may have mutually authentication each other.

At 6001, the NF service consumer 601 signals the NRF 602. This signalling may be a request for an access token. The request may comprise an identifier for the second slice when the NF service consumer 601 is seeking to utilize unauthorized resources.

This request may further comprise a CCA. The CCA may comprise an identification of at least one slice to which the NF service consumer 601 belongs. For example, the CCA may comprise at least one NSSAI (potentially a list of NSSAIs) that the NF service consumer 601 belongs to. The CCA may comprise at least one of the fields listed above. For example, the CCA may comprise:

The NF instance ID of the NF service consumer 601;
A timestamp (iat) and an expiration time (exp) in a header, and
The NF type of the expected audience (audience), e.g. the type "NRF", "NF"

At 6002, the NRF 602 fetches NF profile information for the NF Instance identifier comprised in the request, and compares the NSSAI present in the CCA with the NSSAI present in the retrieved profile.

At 6003, when the NSSAI(s) present in the CCA matches the NSSAI(s) present in the retrieved profile information, the NRF generates a token. The token in the present example comprises at least one identifier of the NSSAI(s) associated with the NF consumer function. This access token may be, for example, an OAuth access token.

At 6004, the NRF 602 signals the NF service consumer 601 the access token generated during 6002 using the signalled second slice identifier.

At 6005, the NF service consumer 601 signals a service request to the NF service producer 603. This service request comprises the access token received at 6003. This signalling may comprise the enhanced CCA may comprise at least one NSSAI (potentially a list of NSSAIs) that the NF service consumer 601 belongs to. The CCA may comprise at least one of the fields listed above. For example, the CCA may comprise:

The NF instance ID of the NF service consumer 601;
A timestamp (iat) and an expiration time (exp) in a header, and
The NF type of the expected audience (audience), e.g. the type "NRF", "NF"

At 6006, the NF service producer 603 verifies the token by determining that the NF service producer serves the slice allowed by the token. This verification may be performed by determining that at least one of the NSSAI value(s) in the received CCA matches with the NSSAI value(s) present in the access token claims.

This verification may further comprise the NF service producer 603 matching at least one other header parameter in the service request to a corresponding value in the CCA received at 6005.

At 6007, the NF service producer 603 signals a service request response the NF service consumer 601 in response to the service request of 6004. This service request response may comprise at least part of the service requested in the service request. When verification at 6006 fails, this service request response may comprise an error code and/or an indication of a failure.

Figure 9:
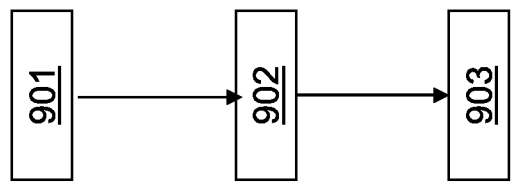
FIGS. 7 to 9 are flow charts illustrating operations that may be performed by apparatus described herein.
Figure 8:
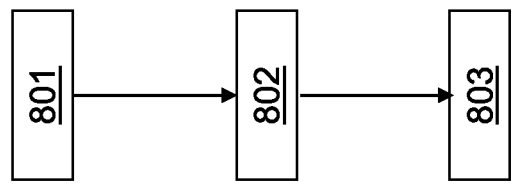
Figure 7:
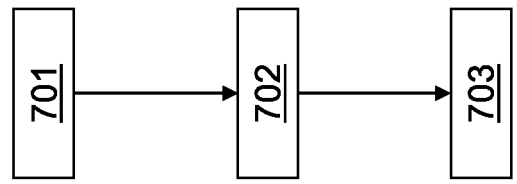

FIGS. 7 to 9 illustrate operations that may be performed by apparatus as described herein. The apparatus corresponding to each Figure may interact with at least one of the apparatuses corresponding to another Figure.

FIG. 7 relates to operations that may be performed by an apparatus for a network repository function.

At 701, the NRF receives, from a network function service consumer, an access request for an access authorization token. The request comprises a first identification of the network function service consumer and a first identification of at least one network slice on which access is requested.

As a specific example of this in the 3GPP system, the NF Service Consumer may request an access token from the NRF in the same PLMN using the Nnrf_AccessToken_Get request operation. The message may include the NF Instance Id(s) of the NF Service Consumer, the requested "scope" including the expected NF Service name(s) and optionally "additional scope" information (i.e. requested resources and requested actions (service operations) on the resources), NF type of the expected NF Service Producer instance and NF Service Consumer. The NF Service Consumer may also include a list of NSSAIs or list of NSI IDs for the expected NF Service Producer instances. The message may include an NF Set ID of the expected NF Service Producer instances. The message may include a list of S-NSSAIs of the NF Service Consumer.

At 702, the NRF generates an access token in response to the request, the access token comprising at least one network slice identifier for the at least one network slice identified by the first identification. This at least one network slice identifier may identify a network slice belonging to the network function service consumer identified by the first identification.

As a specific example of this, the NRF may generate the access token in response to a verification operation. For example, the NRF may verify that the input parameters (e.g., NF type) in the access token request match with the corresponding ones in the public key certificate of the NF Service Consumer or those in the NF profile of the NF Service Consumer or those present in the CCA, if CCA is provided by the NF Service Consumer. The NRF checks whether the NF Service Consumer is authorized to access the requested service(s). If the NF Service Consumer is authorized, the NRF then generates an access token with appropriate claims included. The NRF may digitally sign the generated access token based on a shared secret or private key as described in RFC 7515 [45]. If the NF Service Consumer is not authorized, the NRF does not issue an access token to the NF Service Consumer.

The claims in the token may include the NF Instance Id of NRF (issuer), NF Instance Id of the NF Service Consumer (subject), NF type of the NF Service Producer (audience), expected service name(s), (scope), expiration time (expiration) and optionally "additional scope" information (allowed resources and allowed actions (service operations) on the resources). The claims may include a list of NSSAIs or NSI IDs for the expected NF Service Producer instances, a list of NSSAIs or NSI IDs for the NF Service Consumer. The claims may include the NF Set ID of the expected NF Service Producer instances.

At 703, the NRF provides the generated access token to the network function in response to the request for an access authorization token.

As a specific 3GPP example, when the authorization is successful, the NRF may send the generated access token to the NF Service Consumer in the Nnrf_AccessToken_Get response operation. Otherwise (i.e. when the verification is not successful), the NRF may reply based on Oauth 2.0 error response defined in RFC 6749. The other parameters (e.g., the expiration time, allowed scope) currently sent by NRF in addition to the access token are described in TS 29.510

In general, the request may comprise a certification token signed by the network function service consumer. This certification token may be in accordance with CCA, as described in the specific example above. The certification token may comprise parameters of the network function service consumer, said parameters comprising at least one network slice belonging to the network function service consumer on which access is requested and a second identification of the network function service consumer.

The NRF may use at least one of the certification token signed parameters of the network function service consumer to retrieve profile information for the network function service consumer, the profile information identifying at least one network slice accessible by the network function service consumer. The profile information may be profile information previously registered at the NRF for that network function service consumer. The NRF may verify the access request by comparing identifiers for the network slices identified by the second identification to the at least one network slice identified by the profile information to determine whether any network slices are identified by both the second identification and the profile information. The access token may be generated when there is at least one network slice identified by both the second identification and the profile information. The access token may be only generated when there is at least one network slice identified by both the second identification and the profile information. The access token may be only generated when all of the network slices identified by both the second identification and the profile information match. The access token may be only generated when there is more than one network slice identified by both the second identification and the profile information.

The NRF may use the second identification of the network function service consumer to retrieve profile information for the network function service consumer, the profile information identifying at least one network slice accessible by the network function service consumer. The profile information may be profile information previously registered at the NRF for that network function service consumer. The NRF may verify the access request by comparing identifiers for the network slices identified by the first identification to the at least one network slice identified by the profile information to determine whether any network slices are identified by both the first identification and the profile information. The access token may be generated when there is at least one network slice identified by both the first identification and the profile information. The access token may be only generated when there is at least one network slice identified by both the first identification and the profile information. The access token may be only generated when there is more than one network slice identified by both the first identification and the profile information. The access token may be only generated when all of the network slices identified by both the first identification and the profile information match.

FIG. 8 is a flow chart illustrating potential operations that may be performed by an apparatus for a network function service consumer, such as the network function service consumer interacting with the NRF of FIG. 7.

At 801, the network function service consumer sends, to a network repository function, an access request for an access authorization token. The request may comprise an identification of the network function service consumer and a first identification of at least one network slice on which access is requested.

As a specific example of this in the 3GPP system, the NF Service Consumer may request an access token from the NRF in the same PLMN using the Nnrf_AccessToken_Get request operation. The message may include the NF Instance Id(s) of the NF Service Consumer, the requested "scope" including the expected NF Service name(s) and optionally "additional scope" information (i.e. requested resources and requested actions (service operations) on the resources), NF type of the expected NF Service Producer instance and NF Service Consumer. The NF Service Consumer may also include a list of NSSAIs or list of NSI IDs for the expected NF Service Producer instances. The message may include an NF Set ID of the expected NF Service Producer instances. The message may include a list of S-NSSAIs of the NF Service Consumer.

At 802, the network function service consumer may receive, from the network repository function, an access token in response to the request, the access token comprising at least one network slice identifier for the at least one network slice identified in the first identification.

As a specific 3GPP example, the NRF may digitally sign the generated access token based on a shared secret or private key as described in RFC 7515. If the NF Service Consumer is not authorized, the NRF does not issue an access token to the NF Service Consumer.

The claims in the token may include the NF Instance Id of NRF (issuer), NF Instance Id of the NF Service Consumer (subject), NF type of the NF Service Producer (audience), expected service name(s), (scope), expiration time (expiration) and optionally "additional scope" information (allowed resources and allowed actions (service operations) on the resources). The claims may include a list of NSSAIs or NSI IDs for the expected NF Service Producer instances, a list of NSSAIs or NSI IDs for the NF Service Consumer. The claims may include the NF Set ID of the expected NF Service Producer instances.

The network function service consumer may store the received access token.

At 803, the network function service consumer may send a service request to a network function service producer for accessing a service provided by the network function service producer, the service request comprising the access token.

The access request may comprise a certification token signed by the network function service consumer. The certification token may comprise parameters of the network function service consumer, said parameters comprising at least one network slice belonging to the network function service consumer on which access is requested and a second identification of the network function service consumer. The certification token may be as described above in relation to CCA in the specific example.

The service request may comprise a certification token signed by the network function service consumer. The certification token may comprise parameters of the network function service consumer, said parameters comprising at least one network slice belonging to the network function service consumer on which access is requested and a second identification of the network function service consumer. The certification token may be as described above in relation to CCA in the specific example.

FIG. 9 is a flow chart illustrating potential operations that may be performed by an apparatus for a network function service producer. The network function service producer may interact with the network function service consumer described in relation to FIG. 8.

At 901, the network function service consumer receives, from a network function service consumer, a service request. The service request may comprise an access token and a first identification of at least one network slice for which the service request is requested, and the access token comprising at least one network slice identifier for at least one network slice.

At 902, the network function verifies the service request by comparing the at least one network slice identifier in the access token to the at least one network slice identified by the first identification to determine whether there is at least one match.

As a specific 3GPP example, NF Service Producer ensures the integrity of the token by verifying the signature using NRF's public key or checking the MAC value using the shared secret. If integrity check is successful, the NF Service Producer may verify the claims in the token. This verification may be performed using at least one of the following techniques.

The NF service producer may check that the audience claim in the access token matches its own identity or the type of NF Service Producer. If a list of NSSAIs or list of NSI IDs is present, the NF Service Producer may check that it serves the corresponding slice(s).

If an NF Set ID present, the NF Service Producer may check the NF Set ID in the claim matches its own NF Set ID.

If scope is present, the NF Service Producer may check that the scope matches the requested service operation.

If the access token contains "additional scope" information (i.e. allowed resources and allowed actions (service operations) on the resources), the NF Service Producer may check that the additional scope matches the requested service operation.

The NF Service Producer may check that the access token has not expired by verifying the expiration time in the access token against the current data/time.

If a CCA is present in the service request, the NF Service Producer may verify the CCA as specified in the operating communication protocol and that the subject claim (i.e., the NF Instance Id of the NF Service Consumer) in the access token matches the subject claim in the CCA. It may also verify the NSSAIs or NSI IDs value present in the CCA matches the NSSAIs or NSI IDs of the NF Service Consumer present in the access token claims.

At 903, the network function responds to the service request with information related to the requested service when there is at least one match.

In a specific 3GPP example, when the verification is successful, the NF Service Producer may execute the requested service and responds back to the NF Service Consumer. Otherwise, the NF service producer may reply based on Oauth 2.0 error response defined in RFC 6749.

More generally, the service request may comprise a certification token signed by the network function service consumer. The certification token may comprise parameters of the network function service consumer, said parameters comprising at least one network slice belonging to the network function service consumer on which access is requested and a second identification of the network function service consumer. The certification token may be as described above in relation to CCA in the specific example.

Said verify the service request may further comprise comparing the at least one network slice identifier in the access token to the at least one network slice identified by the second identification to determine whether there is at least one match. By this, it is understood that the values of the identifier are checked for any matches.

The network function service producer's response to the service request with information related to the requested service when there is at least one match may be further dependent on the said determine whether there is at least one match between the at least one network slice identifier in the access token to the at least one network slice identified by the second identification. For example, it may be useful for the network slice identifier in the access token to match both a network slice identifier in the certification token as well as the network slice identifier in the service request.

The network function service producer may respond to the service request with a failure indication when there is no matching network slice identifier.

It is understood that the function names referred to above merely reflect the current terminology used in 3GPP specifications, and that equivalent functions may perform the above-mentioned steps where/when appropriate. For example, the NRF may be considered to be an authentication service for a network function, with the access token mentioned above functioning as an authentication token.

Figure 2:
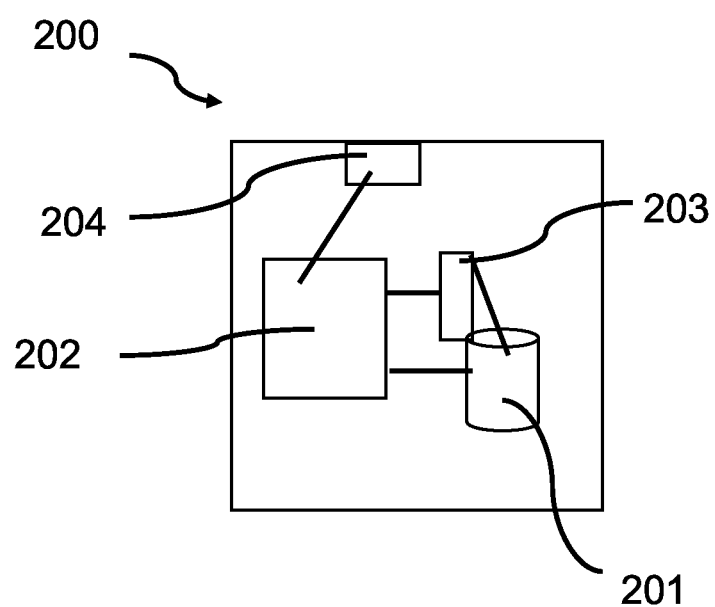
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR etc. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example the control apparatus 200 or processor 201 can be configured to execute an appropriate software code to provide the control functions.

Figure 3:
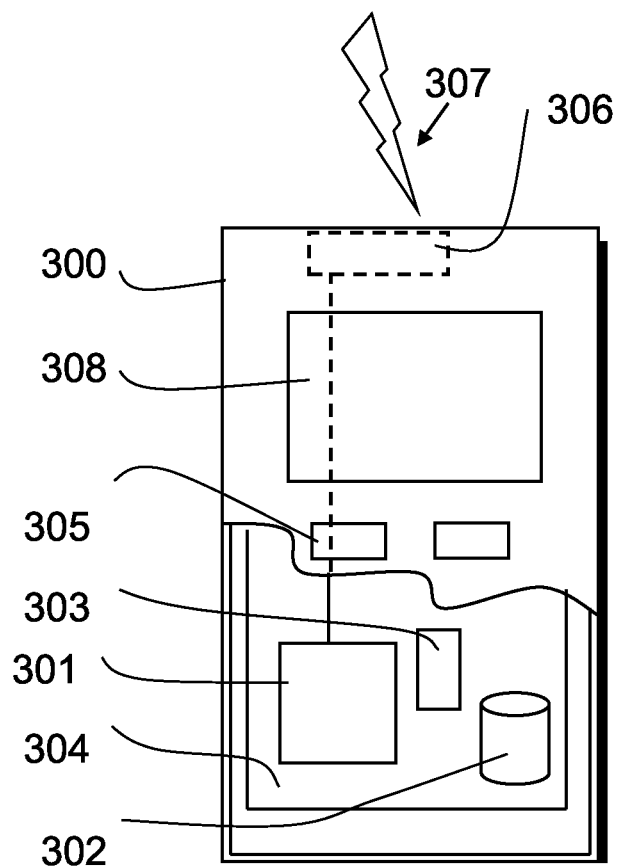
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the wireless device by means of a suitable user interface such as key pad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
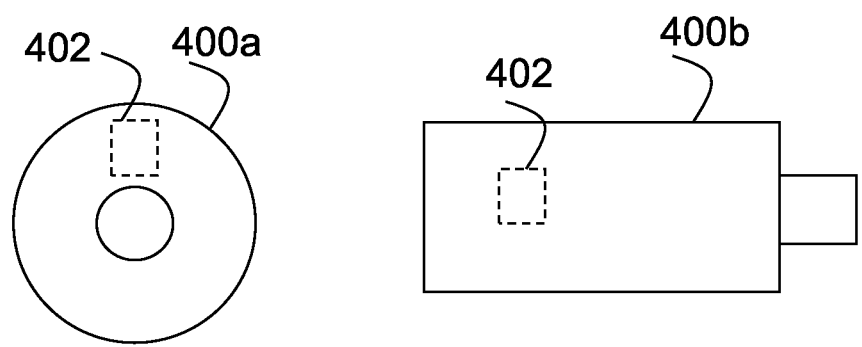
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400a (e.g. computer disc (CD) or digital versatile disc (DVD)) and 400b (e.g. universal serial bus (USB) memory stick) storing instructions and/or parameters 402 which when executed by a processor allow the processor to perform one or more of the steps of the methods of FIG. 7 and/or FIG. 8 and/or FIG. 9.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 7 and/or FIG. 8 and/or FIG. 9, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
  (a) hardware-only circuit implementations (such as implementations in only analogue and/or digital circuitry);
  (b) combinations of hardware circuits and software, such as:
    (i) a combination of analogue and/or digital hardware circuit(s) with software/firmware and
    (ii) any portions of hardware processor(s) with software (including digital signal processor(s)), software, and memory(ies) that work together to cause an apparatus, such as the communications device or base station to perform the various functions previously described; and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus for a network repository function, the apparatus comprising:
 at least one processor; and
 at least one memory comprising code that, when executed by the at least one processor, causes the apparatus at least to:
  receive, from a network function service consumer, an access request for an access token, the access request comprising a network function instance identifier of the network function service consumer, slice identification information of at least one network slice on which access is requested by the network function service consumer, and an enhanced client credentials assertion comprising a certification token digitally signed by the network function service consumer, wherein the enhanced client credentials assertion comprises at least one slice identifier for at least one network slice to which the network function service consumer is authorized;
  retrieve profile information registered to the network function service consumer;
  verify the access request by comparing slice information from the profile information with the at least one slice identifier in the enhanced client credentials assertion;
  generate an access token in response to the access request when verification of the access request is successful based on the enhanced client credentials assertion, the access token comprising the at least one network slice identifier for the at least one network slice to which the network function service consumer is authorized; and
  provide the access token to the network function service consumer in response to the access request.

2. The apparatus of claim 1, wherein:
 the at least one slice identifier in the enhanced client credentials assertion comprises Network Slice Selection Assistance Information (NSSAI) for the network function service consumer.

3. The apparatus of claim 1, wherein:
 the at least one slice identifier in the enhanced client credentials assertion comprises a Network Slice Selection Assistance Information (NSSAI) list for the network function service consumer.

4. The apparatus of claim 1, wherein the apparatus is further caused to:
 verify the access request by further comparing the slice identification information from the access request with the slice information from the profile information and the at least one slice identifier in the enhanced client credentials assertion.

5. A method for a network repository function, the method comprising:
 receiving, from a network function service consumer, an access request for an access token, the access request comprising a network function instance identifier of the network function service consumer, slice identification information of at least one network slice on which access is requested by the network function service consumer, and an enhanced client credentials assertion comprising a certification token digitally signed by the network function service consumer, wherein the enhanced client credentials assertion comprises at least one slice identifier for at least one network slice to which the network function service consumer is authorized;
 retrieving profile information registered to the network function service consumer;
 verifying the access request by comparing slice information from the profile information with the at least one slice identifier in the enhanced client credentials assertion;
 generating an access token in response to the access request when verification of the access request is successful based on the enhanced client credentials assertion, the access token comprising the at least one network slice identifier for the at least one network slice to which the network function service consumer is authorized; and
 providing the access token to the network function service consumer in response to the access request.

6. The method of claim 5, wherein the verifying comprises:
 verifying the access request by further comparing the slice identification information from the access request with the slice information from the profile information and the at least one slice identifier in the enhanced client credentials assertion.

* * * * *